(12) United States Patent
Haddad et al.

(10) Patent No.: US 8,495,377 B2
(45) Date of Patent: Jul. 23, 2013

(54) ENABLING SECURE ACCESS TO SENSOR NETWORK INFRASTRUCTURE USING MULTIPLE INTERFACES AND APPLICATION-BASED GROUP KEY SELECTION

(75) Inventors: Wassim Haddad, San Jose, CA (US); Samita Chakrabarti, Sunnyvale, CA (US)

(73) Assignee: Telefonaktiebolaget L M Ericsson, Stockholm (SE)

( * ) Notice: Subject to any disclaimer, the term of this patent is extended or adjusted under 35 U.S.C. 154(b) by 118 days.

(21) Appl. No.: 13/112,771

(22) Filed: May 20, 2011

(65) Prior Publication Data

US 2012/0210136 A1    Aug. 16, 2012

Related U.S. Application Data

(60) Provisional application No. 61/441,605, filed on Feb. 10, 2011.

(51) Int. Cl.
*H04L 9/32* (2006.01)

(52) U.S. Cl.
USPC .............. 713/176; 713/171; 380/278; 726/29

(58) Field of Classification Search
USPC ....................... 713/171, 176; 380/278; 726/29
See application file for complete search history.

(56) References Cited

FOREIGN PATENT DOCUMENTS

JP         2000364896     * 11/2000

OTHER PUBLICATIONS

Arkko, et al., "IANA rules for the Protocol for Carrying Authentication for Network Access (PANA)", *IETF*, May 2010, 5 pages.
Forsberg, et al. "Protocol for Carrying Authentication for Network Access (PANA)" *Network Working Group*, 46 pages.
Arrko, et al. "Secure Neighbor Discovery (SEND)", Mar. 2005*Network Working Group*, 56 pages.
Chakrabarti, Samita , et al., "Secure Access to IOT Network: An Application-based Group Key Approach", XP002683280; Mar. 2011; URL:http://wvvw.iab.org/sp-content/IAB-uploads/2011/03/Chakrabarti.pdf.

* cited by examiner

*Primary Examiner* — April Y Blair
(74) *Attorney, Agent, or Firm* — Blakely, Sokoloff, Taylor & Zafman

(57) ABSTRACT

A method implemented in a network element for controlling access to a set of resources on a per-application basis, the set of resources including subsets of the resources where each subset is accessible to a set of one or more applications through the use of a separate group key, the method comprising the steps of receiving an authentication request from a node communicatively connected to the network element through a first network interface of the network element, the authentication request including a certificate for the node, validating the certificate for the node, determining that the certificate has been authorized for the set of one or more applications through a query of a certificate database, retrieving each group key that corresponds to the set of one or more applications through a query of a group key database, and returning each group key retrieved from the group key database to the node.

18 Claims, 5 Drawing Sheets

ENABLING SECURE ACCESS TO SENSOR NETWORK INFRASTRUCTURE USING MULTIPLE INTERFACES AND APPLICATION-BASED GROUP KEY SELECTION

CROSS-REFERENCE TO RELATED APPLICATION

The present application claims priority from U.S. Provisional Patent Application No. 61/441,605, filed on Feb. 10, 2011.

FIELD OF THE INVENTION

The embodiments of the invention relate to a system for enabling secure access to resources using application based group keys. Specifically, the embodiments of the invention relate to a system for enabling a node to be authenticated and to obtain group keys that enable secure access to resources such as sensor networks on a per application basis.

BACKGROUND

Machine-to-machine (M2M) communications are utilized to enable devices to communicate both wirelessly and through wired communication with other devices with similar communication capabilities. Machine-to-machine communication can involve a device such as a sensor or a meter that captures and records information about an event such as a temperature reading or a radiation level. This information can then be accessed by an application of the device over a network or with a direct link to the sensor or meter using machine-to-machine communication. The network can be a wireless, wired or hybrid network that includes intermediate nodes. A direct link between the device and the sensor or meter can be either wireless or wired.

The application is a software program that can translate the event information into values having semantic components. The device can be device that has a dedicated purpose such as a meter reader or scanning device. The device can be a low powered device with limited communication and computing capabilities. The device may execute only one application or may execute a small number of separate applications. For example, a meter reader can have separate applications for collecting event information from different models of meters.

Machine-to-machine communication can also be employed between a remote network of devices and a central collection computer. The remote network of devices relay event information back to a central computer for analysis. The central computer runs an application that collects the data from the devices. Machine-to-machine communication can also encompass a system of networks where a central computer transmits data to a plurality of personal appliances or where the central computer receives data from the plurality of personal appliances.

Machine-to-machine communication is not tied to any specific communication medium or protocol. Machine-to-machine communication implementations share a set of characteristics including (1) collection of data, (2) transmission of selected data through a communication network (3) assessment of the data and a (4) response to the available information. Machine-to-machine communication can be utilized in a number of environments such as factory environments where machinery that works on building a product such as car manufacturing equipment can collect event data to monitor the status of these machines and their efficiency. Machine-to-machine communication can also be utilized to track and collect data from utility meters (e.g., gas and electric meters) and in similar situations. Machine-to-machine communication is seen by those skilled in the art as being a discrete technological area from computer networking technologies such as IP networks and cellular communication technologies even though these technologies can be utilized in machine-to-machine communication networks.

SUMMARY

A method implemented in a network element for controlling access to a set of resources on a per-application basis, the set of resources including subsets of the resources where each subset is accessible to a set of one or more applications through the use of a separate group key, the method comprising the steps of receiving an authentication request from a node communicatively connected to the network element through a first network interface of the network element, the authentication request including a certificate for the node, validating the certificate for the node, determining that the certificate has been authorized for the set of one or more applications through a query of a certificate database, retrieving each group key that corresponds to the set of one or more applications through a query of a group key database, and returning each group key retrieved from the group key database to the node.

A network element for controlling access to a set of resources on a per application basis, the set of resources including subsets of the resources where each subset is accessible to a set of one or more applications through the use of a separate group key, the network element comprising: a first network interface module adapted to process an authentication request received from a node over a first network and return a set of one or more group keys for a first of the subsets of resources, wherein the authentication request includes a certificate for the node; and a network processor coupled to the first network interface module, the network processor adapted to execute an authorized group key distribution module to authenticate the node in response to the authentication request and to obtain the set of one or more group keys, the authorized group key distribution module including, a certificate management module adapted to query a certificate database with the certificate from the authentication request received from the node and to determine that the certificate is valid and has been authorized for the set of one or more applications, and a group key module adapted to generate and send a group key query to a group key database, wherein the group key query requests each group key for the set of one or more applications authorized for the certificate from the authentication request received from the node.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
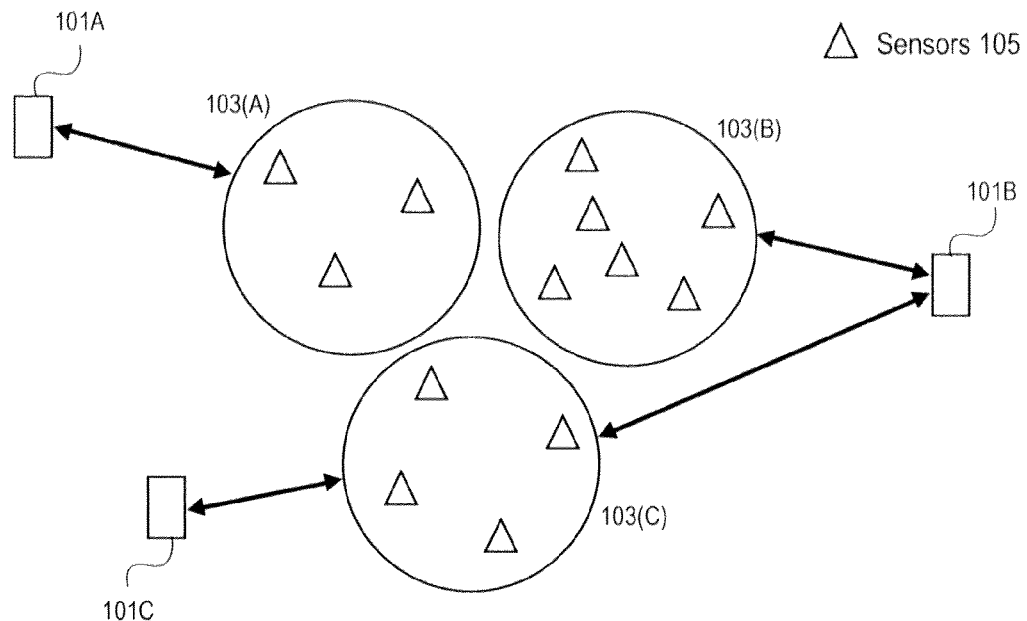
FIG. 1 is a diagram of one embodiment of an example machine-to-machine communication network.

In the following description, numerous specific details are set forth. However, it is understood that embodiments of the invention may be practiced without these specific details. In other instances, well-known circuits, structures and techniques have not been shown in detail in order not to obscure the understanding of this description. I will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiments of FIGS. 1-3. However, it should be understood that the operations of the flow diagrams in FIGS. 4-6 can be performed by embodiments of the invention other than those discussed with reference to FIGS. 1-3, and the embodiments discussed with reference to FIGS. 1-3 can perform operations different than those discussed with reference to the flow diagrams of FIGS. 4-6.

The techniques shown in the figures can be implemented using code and data stored and executed on one or more electronic devices (e.g., an end station, a network element, or similar electronic devices). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or ore busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, or similar networking device.) is a piece of networking equipment, including hardware and software that communicatively interconnects other equipment on the network (e.g., other network elements, end stations, or similar networking devices). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data collection).

The embodiments of the present invention provide a method and system for avoiding the disadvantages of the prior art. The disadvantages of the prior art include that there is no established protocol for the distribution of group keys to requesting devices and applications. There is also no secure and established routine for determining which group keys that a particular application, device or user has permission to access and no automated manner for providing them.

The embodiments of the invention overcome these disadvantages of the prior art. The embodiments of the invention provide a system and process by which a secure information exchange between the sensors and applications can be accomplished over a network infrastructure while preventing the inappropriate access or unauthorized access of the sensors. Authentication can be provided by a second network that is separate from the network infrastructure for accessing the sensors. A device executing the applications connects to an authentication service on the second network. The authentication service validates a certificate from the device using a certificate database and provides a set of group keys that the applications are authorized to access and that are required for the application to access the necessary sensors. The set of group keys are determined by cross referencing the validated certificate provided by an application or device with a group key database.

The embodiments of the invention provide strict security for the connectivity associated with machine-to-machine communication in order to prevent attacks that can lead to significant security breaches and system failures. Unsecured machine-to-machine communication can result in the falsification of information or the inappropriate accessing of information from a sensor network or similar network. The group keys are distributed to the sensors using the protocol for carrying authentication for network access (PANA) protocol. The distribution of these group keys can be used to group the sensors such that they logically correspond to certain functions or applications. In other embodiments, the group keys can be distributed to the sensors using IEEE 802.1x (a port-based network access control protocol) or similar authentication protocols.

The embodiments of the authorized group key distribution system enable the sharing of one or multiple group keys with applications executed by a node (i.e., a user device, such as a meter reader or similar device) upon attachment to a network including the authorized group key distribution system. The group keys provided to the applications of the node can be restricted depending on the application, certificate validation and the authorization and authentication of the node, user and/or the application. After a certificate is validated and a request for group keys is authenticated, the authorized group keys are sent to the application of the node.

The authorized group key distribution system available to an interface of the node that can be separate from the interface utilized for accessing the network of sensors or similar resources. This secondary network can be wireless local area network (LAN), a wide area network (WAN), cellular network (e.g., the global system for mobile communication (GSM) or long term evolution (LTE) network) or similar network that is separate and distinct from the machine-to-machine network used to communicate with the sensors and other devices associated with the applications of the node.

In further embodiments, the resources being accessed by the node and the applications executed by the node are not provided by a separate network and do not specifically require machine-to-machine communication. Rather, in these embodiments, on a per-application basis the system manages the distribution of authorized group keys for resources on a non-machine-to-machine network or hybrids of non-machine-to-machine and machine-to-machine networks.

The embodiments of the invention involve a system and process where a certificate has been associated with a user, node (i.e., a device) or application. These certificates have been distributed to the nodes and the corresponding certificate validation information has been stored in a certificate database on a network through which the validation, authentication and authorized group key distribution is to take place. The authentication process can be carried out by an access router, gateway node, or other network elements. Group keys that have been distributed in the sensor network or otherwise distributed to the relevant resources are also stored in a group key database on the authorized group key distribution network.

In one example embodiment, the communication between a node executing an application and a network element of the authorized group key distribution network can utilize the secure neighbor discover (SeND) protocol or similar protocol.

In authorized group key distribution system and process, an abstraction between the sensor network infrastructure and the application utilizing the data collected by the sensors in the sensor network has been made. The method for accessing the set of sensors required by an application of a node is to obtain the requisite group keys. The process for obtaining the requisite group keys is made through a separate interface of the node than that which is used to communicate with the sensors over the sensor network. This process and system removes limits to authentication of nodes using machine-to-machine interfaces to communicate with a sensor or similar device, caused by the limited processing capabilities and power constraints on the devices in the sensor network infrastructure. A secondary network can be leveraged to establish shared secrets between the node (i.e., the user device) and the sensor network infrastructure.

FIG. 1 is a diagram of one embodiment of an example environment in which the authorized group key distribution system and process can be utilized. In the illustrated example of FIG. 1 a set of sensors 105 has been subdivided into subsets 103A-103C. A 'set' or 'subset,' as used herein, refers to any positive whole number of items including one item. A 'subset' is further a number of items that is wholly encompassed by a corresponding set, such that the subset can be any number of items up to the entire number of items in the set. Each of the subsets of sensors 103A-103C can correspond to a specific application or a set of applications. For example, a first subset of sensors 103A could be related to measuring a first metric such as temperature whereas a second subset of sensors 103B measures the second metric such as air pressure and a third subset of sensors 103C measures a third metric such as humidity. Each of these sensors can be accessed or utilized by different applications or combinations of applications. In the illustrated example, a node 101A executes an application that only has authorization (i.e., permission) to obtain the data from the first subset of the sensors 103A. Similarly, the node 101B is authorized only to communicate with the subset of sensors 103C, while the node 101C executes an application that is authorized to communicate and obtain data from sensor subsets 103B and 103C. In each case, the communication between these nodes and the respective sensor subsets are secured and the sensors in subsets 103A-103C have each been distributed a group key that is common to each subset. The sensor subset 103A assigned a first group key while the sensor subsets 103E and 103C are distributed, a second and third group key, respectively. Communication between the nodes 101A-101C and the sensors 105 is through machine-to-machine communication.

In other embodiments, the communication between the nodes 101A-101C can be through any communication network or means including both wired and wireless networks and hybrids thereof. These networks may be Internet protocol networks or cellular communication networks and similar networks. The sensors 105 are provided by way of example. One skilled in the art would understand that any type of resource that can store data and can communicate with the node 101A-101C could also be utilized in this system and process.

Figure 2:
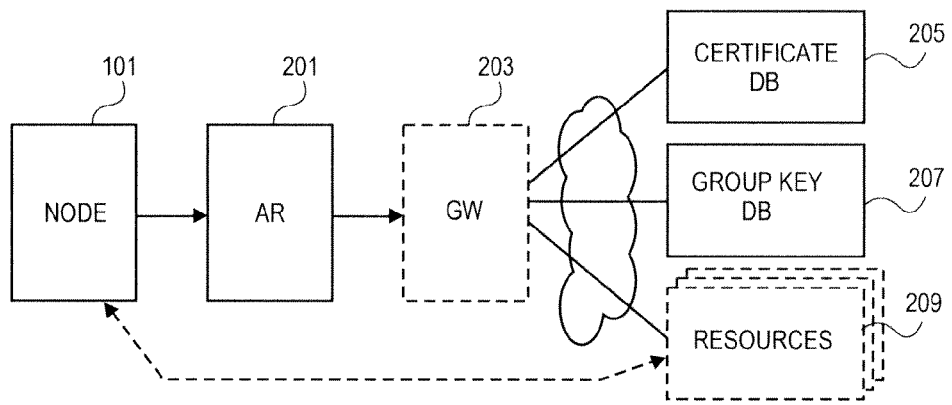
FIG. 2 is a diagram of one embodiment of an authorized group key distribution network.

FIG. 2 is a diagram of one embodiment of a network implementing an authorized group key distribution process. This network can be a part of or separate from the sensor networks or from the networks through which the resources are accessible by applications of the node. In one embodiment, this authorized group key distribution network includes the user node 101, an access router 201, a gateway 203, a certificate database 205 and a group key database 207. In another embodiment, the resources such as sensors or other resources that the node 101 seeks to gain access to through its applications are also present on this network.

The node 101 can be any type of computing device capable of executing an application and communicating with a resource such as a sensor and an access router or similar device to which the application and its certificate can be authenticated and validated, respectively. A node can be any type of personal computing device or general computing device such as a hand held device (e.g., a meter reader or scanner), a cellular communication device (e.g., a smart phone), a laptop, a desktop, a tablet computer or similar computing device. The application that is executed by the node 101 can be any type of application that requires external resource data such as sensor data accessible through a machine-to-machine communication network.

The access router 201 can be any type of network element capable of communicating and connecting with nodes 101 and similar devices. The access router 201 can provide wireless or wired communication access to a network including a local area network (LAN) or a wide area network (WAN) (e.g., the Internet). In one embodiment, the access router 201 can perform the authorized group key distribution process that enables the node 101 to access the resources required by its application. In other embodiments, the authorized group key distribution process is executed by the gateway 203 or similar networking element. The gateway 203 can be in direct communication with an access router 201 or in communication with the access router 201 and node 101 through any number of intermediate network elements.

The certificate database 205 stores the set of certificates through, which the connected node 101 or an application executed by the node 101 can be authenticated. Any type of security certificate validation process can be utilized to validate the certificate provided by the node 101. In one embodiment, the certificate of the node 101 is validated by comparison with the stored information within the certificate database 205 including copies of the certificate and expiration information. The certificate database 205 can be provided by a dedicated server or a non-dedicated network element within the authorized group key distribution network. In one embodiment, the certificate database 205 is local or hosted by the access router 201 or gateway 203 that performs the authorized group key distribution process.

In one embodiment, the group key database 207 stores a set of group keys that have been distributed to subsets of resources 209 that are available on the same network or a separate network. The group key database 207 can be hosted or maintained by a dedicated server or a non-dedicated network element. In one embodiment, the group key database 207 can be hosted by a server shared with the certificate database 205. The group key database 207 can also be hosted or maintained by the access router 201 or gateway 203 that performs the authorized group key distribution process.

The resources 209 in some embodiments can be accessible on the authorized group key distribution network. In other embodiments, these resources are not accessible to the authentication network and are only accessible through the machine-to-machine network that the node 101 accesses through a separate communication interface with the machine-to-machine network either directly or indirectly and/or any combination thereof. The authorized group key distribution network and the network elements that provide the authorized group key distribution services to the node 101 can also provide the key distribution services to the resources and similar services. In one embodiment, the access router 201 or gateway can distribute the group keys to the resources using a protocol for carrying authentication for network access (PANA), a port-based network access control (PNAC) protocol (IEEE 802.1x) or authentication protocol. For sake of clarity, the components for implementing the distribution of keys to the resources have been omitted to avoid confusion with the components implementing the authorized group key distribution for nodes and applications executed by the nodes.

In further embodiments, the user node 101 can communicate directly with the certificate database 205 and/or group key database 207 or without passing through a gateway 203 or attaching to an access router 201. One skilled in the art would understand that other combinations or permutations of the described architectures and configurations are possible consistent with the principles and structures described herein. The user node 101 can be authenticated and obtain a set of group keys for which the user node 101 or its applications are authorized using any network configuration and combination of servers that are capable of authenticating the user node 101 and determining the set of group keys for which the authenticated user node 101 is authorized. Resources 209 to be accessed can be accessible through any network or through direct communication links with the user node 101. The illustrated embodiments are provided by way of example and not limitation.

Figure 3:
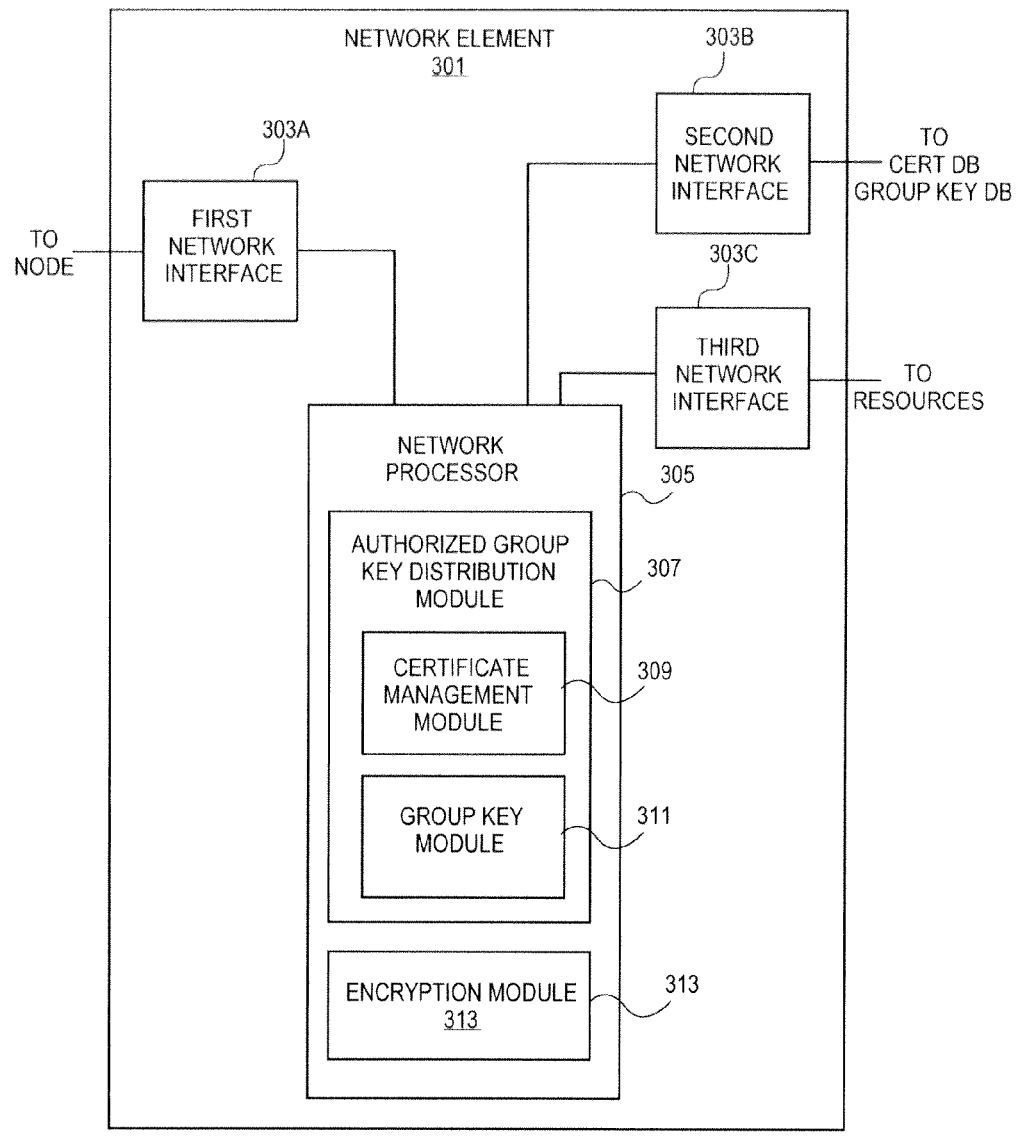
FIG. 3 is a diagram of one embodiment of a network element implementing an authorized group key distribution process.

FIG. 3 is a diagram of one embodiment of a network element for providing the authentication process. The network element 301 can include a set of network interfaces 303A-C and a network processor 307. The network interfaces 303A-C can handle the processing of data packets being received by the network element 301 at the physical link and data link level. The network interfaces 303A-C can also handle the processing of data packets being transmitted by the network element 301 at the physical link and data link level. Separate network interfaces can be present for communicating with a user node (i.e., first network interface 303A), communicating with a certificate database or group key database (i.e., second network interface 303B), and for communicating with resources third network interface 303C). The network processor 307 handles the routing, forwarding and higher level processing of the data traffic. The network processor 307 can execute or include an authorized group key distribution module 307, which includes a certificate management module 309 and a group key module 311.

The first network interface 303A can provide an interface for communication with the user node executing an application that is requesting authentication and a set of group keys for accessing a resource. The first network interface 303A can also provide an interface for responding to the authentication a group key request. The first network interface 303A can process the level 1 (L1) and physical layer communication components that provide the connectivity to the user node.

The second network interface 303B can provide a communication interface with the certification database and/or group key database through which the queries of these databases can be performed. The second network interface 303B can also provide a communication interface through which responses to the queries of the certification database and group key database are received.

The third network interface 303C can provide a communication interface with the set of resources in embodiments where the authorized group key distribution network is capable of communicating with these resources and provides the connectivity between the user node and the resources. This third network interface 303C can be utilized to distribute group keys to the set of resources in embodiments where the group keys are distributed to the resources on the same network element that provides the group keys to the user node.

The network processor 305 can be any type of network processor utilized in a network element (e.g., an access router or gateway router). The network processor 305 executes an authorized group key distribution module 307 that manages the authentication of user nodes and applications on the nodes by communicating with the certificate database and group key database through the certificate management module 309 and group key module 311, respectively.

In one embodiment, the certificate management module 309 generates queries necessary to obtain certificate validation information from the certificate database to enable validation of the certificate provided by a user node. In other embodiments, the certificate management module 309 sends a query to the certificate database that includes the certificate received from the user node. The response from the certificate database then indicates whether the certificate is valid. In either embodiment, once the certificate has been validated, then the user node, the application of the node and/or the request message itself are authenticated based on the provision of a valid certificate. As used herein, 'validation' refers to the process by which an object, in this case a certificate also referred to as a security certificate, is analyzed to verify that it is valid (i.e., functional and not expired). A valid certificate can be required to have any set of constituent information and can be verified by comparison with a valid copy of the certificate maintained by the certificate database or through similar processes. An 'authentication' process, as used herein, refers to a process whereby a user, application, node (i.e., a device) or similar entity has its identity verified. In this case the user, application or node can be authenticated by requiring the provision of a valid certificate with a known association with the user, application or node that is stored in a certificate database. If the user, application or node provides a valid certificate that matches the valid certificate associated with the user, application or node stored in the certificate database, then the identity of the user, application or node is authenticated.

In one embodiment, once the user, application or node is authenticated, then the set of group keys for which the user, application or node is authorized or has permissions for must be retrieved. The certificate information received from the node can be associated with any number of group keys. The certificate management module 309 can include in its query of the certificate database, a request to obtain the authorizations or permissions associated with the certificate such that the authorized group key distribution module 307 can ascertain which group keys that the node making the request is authorized to obtain. Once the authorized group key distribution module 307 receives the authorization information from the certificate management module 309, the authorized group key distribution module 307 can request the corresponding group keys from the group key module 311, which generates a query to a group key database to obtain the keys.

In another embodiment, the certificate database and group key database can be components housed within the same network element or in separate network elements in direct communication with the network element 301. The relationship between the authorization or permissions and the certificate in regard to the group keys can also be maintained or determined by the network element 301 or in the group key database.

These databases, the certificate database and group key database, can be stored and managed by database management systems on a set of fixed storage devices such as hard discs, solid state memories or similar structures that are housed within a server, multiple servers, in the network element or in other computing devices in communication with the network element 301. In one embodiment, the certificate database and group key databases are discrete databases maintained by respective database management software on separate computing devices that communication with the network element 301 through a second network interface 303B.

In one embodiment, the network processor 305 also provides an encryption module 313. The encryption module 313 can encrypt messages sent to and from the network element 301. In particular, the encrypt on module 313 can encrypt and digitally sign reply messages sent in response to authentication requests to protect the group keys provided in these messages from being intercepted by third parties.

Figure 4:
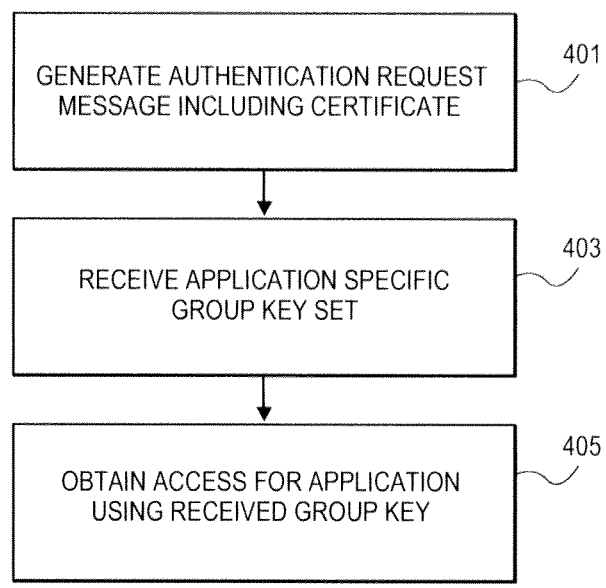
FIG. 4 is a flowchart of one embodiment of the process executed by a device requesting authentication.

FIG. 4 is a diagram of one example embodiment of an authentication request process executed by an application of a node. In one embodiment, the process is initiated by generating an authentication request message that includes a certificate specific to the user or the application generating the request (Block 401). An authentication request message can be initiated by application or user through the user device as part of the protocol by which the user device connects or attaches to the authentication network. The authentication request messages can utilize any format or protocol for being transmitted to the access router and ultimately to the ultimately to the network element providing the authorized group key distribution module if it is separate from the access router. In one example embodiment, the authentication request message is an authentication request message using the SeND format or protocol as discussed further herein below.

In response to sending the authentication request message to the authorized group key distribution node, the user node or an application executed by the user node receives an application specific group key set (Block 403). The application receives those group keys that the certificate provided by the node to the authorized group key distribution network determines that the node or application of the node is authorized to obtain. In some embodiments, these group keys may be filtered to those that are needed or specific to the application requesting them. This can be done at the time that the group key set is returned to the node or an authentication request message can include identification of the application for which the group key set is requested. After the group key set has been received, then the application can obtain access to the desired information and resources either through connecting to the machine-to-machine network or through other networks such a public network over which, an existing machine-machine network connection or through the connection to the authorized group key distribution network depending on the type of resources to be accessed and the application accessing them.

Figure 5:
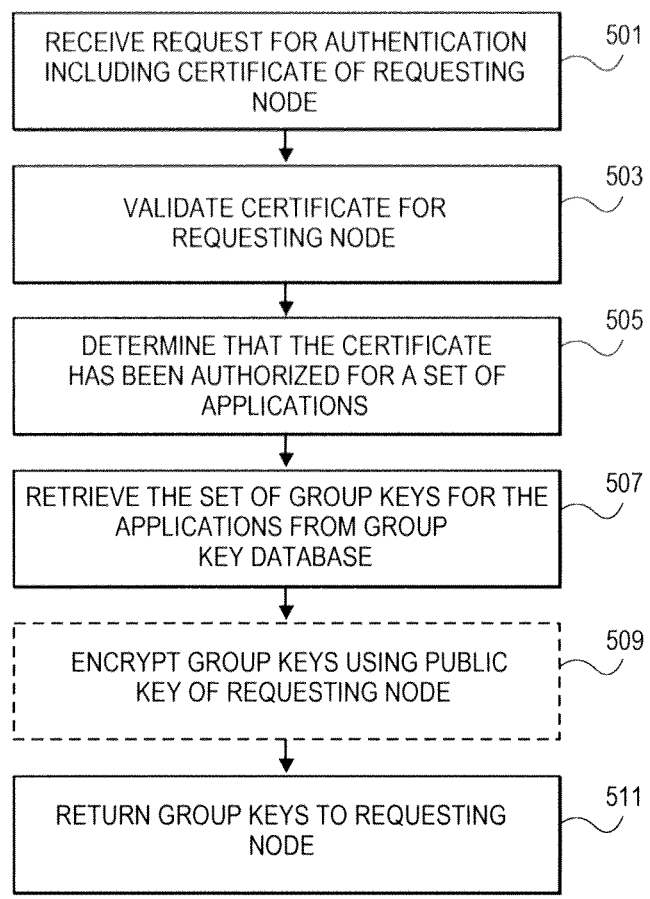
FIG. 5 is a flowchart of one embodiment of the process executed by the network element to distribute group keys to authorized devices.

FIG. 5 is a flowchart of one embodiment of the process executed by the network element to distribute group keys to authorized devices. In one embodiment, this process is initiated at the network element when it receives a request for authentication including a certificate from the requesting node (Block 501). The request for authentication can be in the form of an authentication request message using the SeND protocol or similar protocol.

In response to receiving a request for authentication from the node, the certificate for the node is validated (Block 503). This validation can include generating a query to the certificate database to obtain certificate validation information to validate the certificate of the node. In other embodiments, the certificate received from the node is provided to the certificate database with the query and the certificate database responds with an indicator of validation. In further embodiments, the certificate database can also store authorization information or permissions related to each certificate and provide this information in the response to the query.

The set of authorized applications associated with a certificate is then determined (Block 505). The authorized applications can be identified and tracked by the certificate database in connection with the certificate information and returned to the network element. In other embodiments, the network element maintains the permissions or authorizations for certificates and applications. The authorizations and permissions also link the applications with a specific set of group keys needed by each application or node to access resources utilized by the application or node.

The set of group keys associated with each of the applications of the node that generated the authentication request and that have been authorized for each of the applications can then be retrieved from the group key database (Block 507). The group keys can be retrieved through a query to the group key database that identifies the set of applications or the set of resources for which the group keys are needed. These group keys are then returned by the group key database to the network element.

In one embodiment, these group keys are then encrypted by an encryption module of the network element using public keys of the requesting node or through a similar encryption mechanism (Block 509). This prevents the group keys from being intercepted by a third party when being transmitted back to the requesting node (Block 511). The group keys can be transmitted back to the node that sent the authentication request message using any protocol including the SeND protocol.

Figure 6:
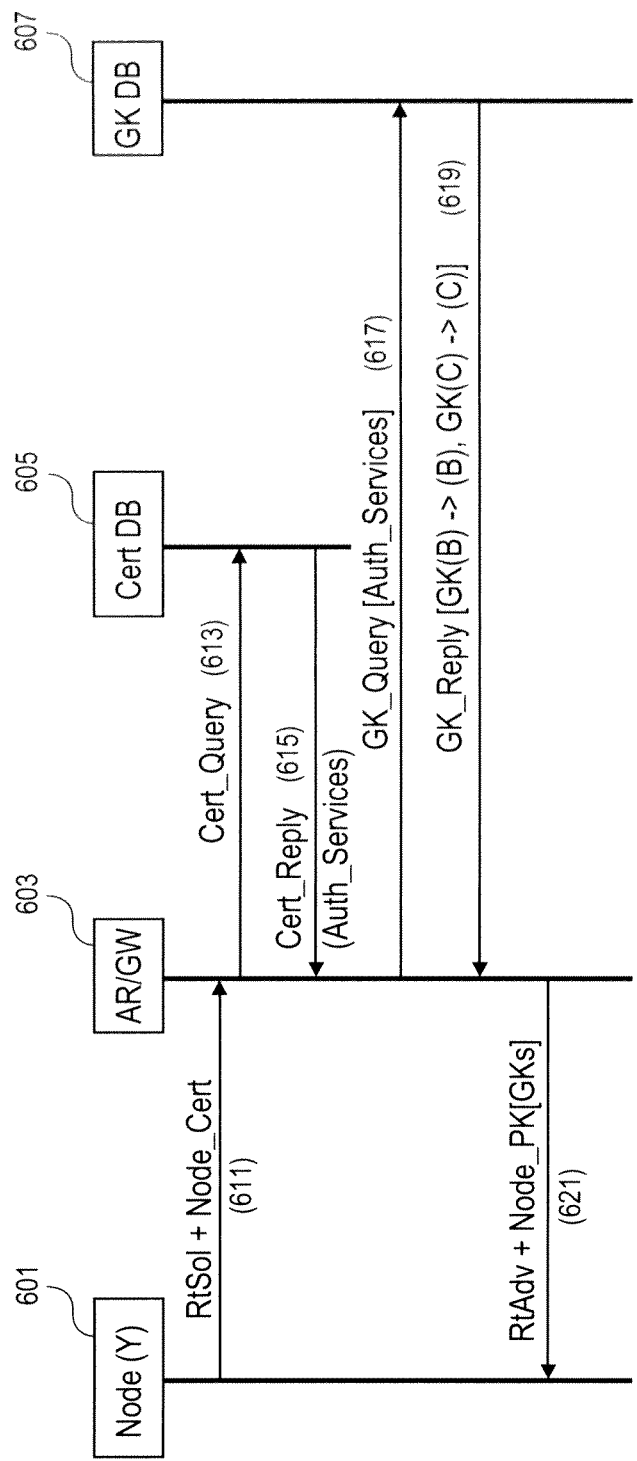
FIG. 6 is a diagram of one example embodiment of a messaging protocol for implementing the authentication, validation and authorized group key distribution process.

FIG. 6 is a diagram of one example embodiment of a messaging protocol for implementing the authentication, validation and authorized group key distribution process. This example assumes that group keys (GKs) are distributed to the sensors (e.g., depending on the offered services) through an access gateway and that the group keys are also stored in a group key database within the authorized group key distribution network.

The first step in this example embodiment is the attachment to the access infrastructure of the authorized group key distribution network. As discussed herein above, the attachment procedure for the attaching node 601 can be done via an e that is different from the M2M interface utilized to access the sensors. The data to be collected from the sensors may subsequently be sent to other locations via a secure connection. In this example, the SeND protocol is used and the node attaching to the network sends its certificate in an RtSol message 611 to the access router (AR) 603 of the authorized group key distribution network.

Upon receiving the RtSol message 613, an access router or gateway (GW) 603 can generate a Cert_Query 613 that queries a certificate database 605 to determine whether the certificate from the node 601 is valid. The certificate database 605 responds with a Cert_Reply message 615 indicating whether the certificate is valid or providing information necessary for making this determination of validity. The Cert_Reply 615 can also include a listing of authorized services or similar permissions information for the certificate that was validated.

Once it has been determined that a valid certificate was received, the AR or GW 603 can query a special group key database 607 and fetch the associated services authorized for this particular certificate using the GK_Query[Auth_Services] message 617. The group key database 607 retrieves the appropriate group keys for each authorized service and returns them to the access router or gateway 603 using a GK_Reply[GK(B)->(B),GK(C)->(C)] message 619. The next step can include sending a unicast RtAdv message 621 to the attaching node. The RtAdv message may carry the group keys needed to access each authorized service. For this purpose, the access router or gateway can encrypt each group key using the attaching node's public key (i.e., in addition to signing the message with its SeND-based certificate).

The attaching node can also specify which services it wants to use in an option carried in the RtSol message. In this case, the access router or gateway 603 may only fetch the group keys associated with these specified services. After completing the attachment procedure, the node has already obtained the necessary group keys for enabling its applications to access the requisite sensors, which are then stored in its cache memory and bound to each of the corresponding services or applications. A lifetime is also associated with each group key that would allow a periodical refresh of the group keys (i.e., using SeND). The group keys are then used by the M2M interface to query sensors offering the requested services.

This messaging process is provided by way of example and not limitation. One skilled in the art would understand that the principles of this messaging process can be applied to other architectures and configurations. In other embodiments, the node 601 can communicate directly with the certificate database 605 and/or group key database 607, in which case the node 601 can generate the appropriate queries to the respective databases to carry out the authentication of the node and to obtain the appropriate set of group keys for which it is authorized. Any message format or protocol can be utilized to implement the messaging process.

These embodiments provide an abstraction between the sensor infrastructure and the delivered application or service. The embodiments focus on the latter, in order to reach the sensors by channeling the obtained keys from one interface to the M2M interface and to avoid any direct exchange with the entire sensor infrastructure. Using the security mechanisms that have been designed only to access the network infrastructure in order to deliver per application group keys is a powerful optimization as it removes many obstacles that are expensive (e.g., processing power) to establish shared secrets between the node and the sensor infrastructure. In some embodiments, a "per-node" and "per-service" shared secret is provided during the network access procedure depending on how the sensor network infrastructure is deployed.

Thus, a method, system and apparatus for secure access to sensor network infrastructure using multiple interfaces and application based group keys have been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented in a network element for controlling access to a set of resources on a per application basis, the set of resources including subsets of the resources where each subset is accessible to a set of one or more applications through use of a separate group key, method comprising the steps of:
receiving an authentication request from a node communicatively connected to the network element through a first network interface of the network element, the authentication request including a certificate for the node;
validating the certificate for the node;
determining that the certificate has been authorized for the set of one or more applications through a query of a certificate database;
retrieving each group key that corresponds to the set of one or more applications through a query of a group key database; and
returning each group key retrieved from the group key database to the node.

2. The method of claim 1, further comprising the steps of: encrypting each group key, and
wherein the step of returning each group key includes returning each group key as an encrypted group key.

3. The method of claim 1, wherein the authentication request is received on the first network interface and at least one subset of the resources is accessible through a second network interface of the network element.

4. The method of claim 1, wherein the step of receiving the authentication request includes receiving an identifier of a first application from the set of one or more applications for which a first of the group keys is requested.

5. The method of claim 4, wherein the query of the certificate database returns the set of one or more applications.

6. The method of claim 1, wherein the set of resources are accessible to the node through a second network interface of the node.

7. The method of claim 6, wherein the first network interface of the network element connects the network element to the node through a first network interface of the node over a first network having a first network architecture, and
wherein the second network interface of the node connects the node to a first subset of the resources through a second network having a second network architecture separate from the first network architecture.

8. The method of claim 7, wherein the second network architecture is a machine-to-machine (M2M) architecture.

9. The method of claim 8, wherein the node is a personal computing device executing one application from the set of one or more applications that communicates with a sensor over the second network to collect an event from the sensor using a secure communication protocol based on the group key of the one application.

10. A network element for controlling access to a set of resources on a per application basis, the set of resources including subsets of the resources where each subset is accessible to a set of one or more applications through use of a separate group key, the network element comprising:
- a first network interface module adapted to process an authentication request received from a node over a first network and return a set of one or more group keys for a first of the subsets of resources, wherein the authentication request includes a certificate for the node; and
- a network processor coupled to the first network interface module, the network processor configured to authenticate the node in response to the authentication request and to obtain the set of one or more group keys, to query a certificate database with the certificate from the authentication request received from the node and to determine that the certificate is valid and has been authorized for the set of one or more applications, and
- to generate and send a group key query to a group key database, wherein the group key query requests each group key for the set of one or more applications authorized for the certificate from the authentication request received from the node.

11. The network element of claim 10, further comprising:
- a second network interface module adapted to process queries to the certificate database or the group key database.

12. The network element of claim 10, wherein the network processor is further configured to sign and encrypt each group key to be returned to the node.

13. The network element of claim 10, wherein the network processor is adapted to process resource requests from the node.

14. The network element of claim 13, further comprising:
- a third network interface module adapted to communicate with the set of resources to obtain data to service the resource requests from the node.

15. The network element of claim 10, wherein the network processor receives an identifier of a first application from the set of one or more applications with the authentication request and queries the certification database specifically for the first application corresponding to the identifier.

16. The network element of claim 10, wherein the first network interface module connects the network element to the node over the first network having a first network architecture, and
- wherein a fourth network interface module of the node connects the node to the first subset of the resources through a second network having a second network architecture separate from the first network architecture.

17. The network element of claim 16, wherein the second network architecture is a machine-to-machine (M2M) architecture.

18. The network element of claim 17, wherein the node is a personal computing device executing one of the applications from the set of one or more applications that communicates with a sensor over the second network to collect an event from the sensor using a secure communication protocol based on the group key of the application.

* * * * *

UNITED STATES PATENT AND TRADEMARK OFFICE
CERTIFICATE OF CORRECTION

PATENT NO. : 8,495,377 B2
APPLICATION NO. : 13/112771
DATED : July 23, 2013
INVENTOR(S) : Wassim Haddad and Samita Chakrabarti It is certified that error appears in the above-identified patent and that said Letters Patent is hereby corrected as shown below:

On the Title Page, in Item (73), under Assignee Name, after "Telefonaktiebolaget L M Ericsson", please insert --(publ)--.

Signed and Sealed this
Fifth Day of November, 2013

Teresa Stanek Rea
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,495,377 B2 |
| APPLICATION NO. | : 13/112771 |
| DATED | : July 23, 2013 |
| INVENTOR(S) | : Haddad et al. |

Page 1 of 1

It is certified that error appears in the above-identified patent and that said Letters Patent is hereby corrected as shown below:

In the Specification

In Column 3, Line 22, delete "I will" and insert -- It will --, therefor.

In Column 3, Line 52, delete "ore" and insert -- more --, therefor.

In Column 4, Line 58, delete "system" and insert -- system is --, therefor.

In Column 6, Line 4, delete "103E" and insert -- 103B --, therefor.

In Column 7, Line 29, delete "or" and insert -- or similar --, therefor.

In Column 7, Line 64, delete "resources" and insert -- resources (i.e., --, therefor.

In Column 9, Line 35, delete "encrypt on" and insert -- encryption --, therefor.

In Column 10, Line 5, delete "machine-machine" and insert -- machine-to-machine --, therefor.

In Column 10, Line 67, delete "an e" and insert -- an interface --, therefor.

Signed and Sealed this
Eleventh Day of February, 2014

Michelle K. Lee
*Deputy Director of the United States Patent and Trademark Office*